(12) United States Patent
Bernoni

(10) Patent No.: US 6,916,072 B2
(45) Date of Patent: Jul. 12, 2005

(54) MOTOR VEHICLE WHEEL WITH IMPROVED PROTECTIVE RING

(75) Inventor: Claudio Bernoni, Selvazzano Dentro (IT)

(73) Assignee: O.Z. S.p.A., Vincenza (IT)

(*) Notice: Subject to any disclaimer, the term of this patent is extended or adjusted under 35 U.S.C. 154(b) by 0 days.

(21) Appl. No.: 10/470,932

(22) PCT Filed: Jun. 7, 2002

(86) PCT No.: PCT/IB02/02114
§ 371 (c)(1), (2), (4) Date: Jul. 31, 2003

(87) PCT Pub. No.: WO02/100659
PCT Pub. Date: Dec. 19, 2002

(65) Prior Publication Data
US 2004/0066084 A1 Apr. 8, 2004

(30) Foreign Application Priority Data
Jun. 12, 2001 (IT) .................................... B02001A0372

(51) Int. Cl.[7] .............................................. B60B 7/01
(52) U.S. Cl. ................................. 301/37.24; 301/37.371
(58) Field of Search ....................... 301/37.101, 37.102, 301/37.24, 37.371, 37.106

(56) References Cited

U.S. PATENT DOCUMENTS

| | | | | |
|---|---|---|---|---|
| 636,012 A | * | 10/1899 | Strong | 301/63.102 |
| 1,861,432 A | * | 6/1932 | Barber | 301/37.371 |
| 1,971,604 A | * | 8/1934 | Frank | 301/36.1 |
| 2,048,442 A | * | 7/1936 | Frank | 301/6.2 |
| 2,380,649 A | * | 7/1945 | Hollerith | 152/406 |
| 2,428,469 A | * | 10/1947 | Plant et al. | 301/37.371 |
| 2,963,319 A | | 12/1960 | Barnes | |
| 3,260,295 A | * | 7/1966 | Rhodes | 152/511 |
| 3,891,276 A | * | 6/1975 | Spisak | 301/37.24 |
| 4,818,030 A | * | 4/1989 | Yoshida | 301/5.24 |
| 5,820,225 A | * | 10/1998 | Ferriss et al. | 301/37.371 |

FOREIGN PATENT DOCUMENTS

| | | |
|---|---|---|
| DE | 19821168 | * 11/1999 |
| DE | 198 21 168 | 11/1999 |
| EP | 0 022 740 | 1/1981 |
| EP | 0022740 | * 1/1981 |
| EP | 0 022 741 | 1/1981 |

* cited by examiner

Primary Examiner—Russell D. Stormer
(74) Attorney, Agent, or Firm—Fay, Sharpe, Fagan, Minnich & McKee, LLP

(57) ABSTRACT

The invention relates to a wheel (1) comprising a rim (2), a disc (3), a protective ring (4) with an outer surface (4a) and an inner surface (4b), and means (5) for fixing the ring (4) to the rim (2). To facilitate separation of the ring (4) from the rim (2), the protective ring (4) can be accessed from the inner surface (4b) through holes (8) made in the lip (2a) of the rim (2).

9 Claims, 3 Drawing Sheets

MOTOR VEHICLE WHEEL WITH IMPROVED PROTECTIVE RING

TECHNICAL FIELD

The present invention relates to a motor vehicle wheel with an improved protective ring.

BACKGROUND ART

Motor vehicles wheels, especially wheels made of light alloy, are frequently damaged on their side surfaces near the tires. The damage is usually caused by the wheel knocking and scraping against obstacles such as curbs, walls and stones.

To avoid having to change the entire wheel or the tire, the wheel may be fitted with a protective ring. The protective rings also have a decorative function since they can be made of materials with suitable ornamental properties or treated on the surface more easily than the entire wheel in order to obtain a desired decorative effect.

For example, U.S. Pat. No. 1,948,272 discloses a ring construction for ornamenting wheel rims. The ring can be applied to one of the outer portions of the rim edge and in cross section presents a concave and convex profile shaped to match and fit snugly to the wheel rim. Owing to the highly curved shape of the ring section, the ring is difficult to remove from the rim.

European patents EP-0 022 740 and EP-0 022 741 disclose another two protective rings. One drawback of the ring constructions described in these patents relates to the presence of screws on the outer edge. Damage to the screws as a result of the wheel striking an obstacle makes it impossible or very difficult to remove the ring itself or the ring fixing device because an ordinary tool cannot be used to undo the damaged screws. Moreover, the deformation of the ring caused by the impact may make it difficult to take the ring off the wheel rim even if the screws are removed.

Patent document WO-93/07012 discloses a wheel with another type of protective ring, in this case glued to the rim.

Again, however, if the ring is damaged, it becomes difficult to remove it from the wheel because of the residual glue.

DISCLOSURE OF THE INVENTION

The present invention has for an object to provide a motor vehicle wheel with an improved protective ring that can be removed easily even when it is damaged.

Another object of the invention is to provide a motor vehicle wheel with an improved protective ring that is simple and economical to construct and that has an attractive design.

In accordance with one aspect of it, the present invention discloses a motor vehicle wheel with an improved protective ring as described in claim 1 below.

The dependent claims describe preferred, advantageous embodiments of the invention.

DESCRIPTION OF THE DRAWINGS

The preferred embodiments of the invention will now be described, without restricting the scope of the inventive concept, with reference to the accompanying drawings in which.

DESCRIPTION OF THE ILLUSTRATIVE EMBODIMENTS

Figure 1:
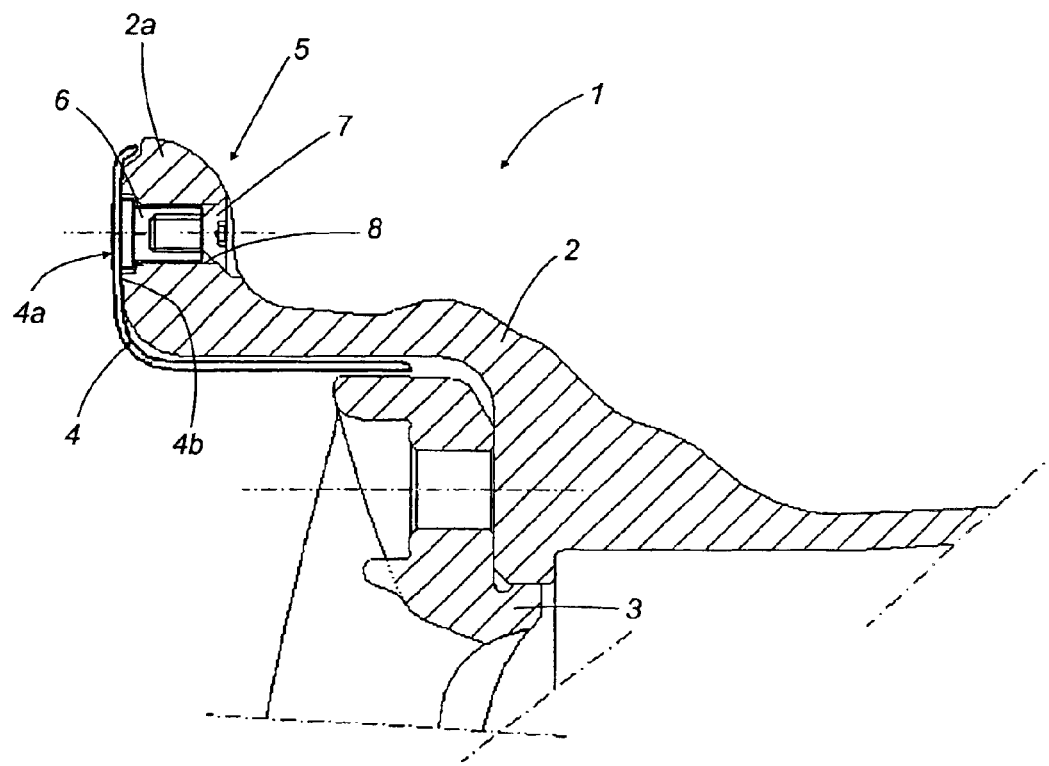
FIG. 1 is a partial cross section of the wheel according to present invention.
Figure 2:
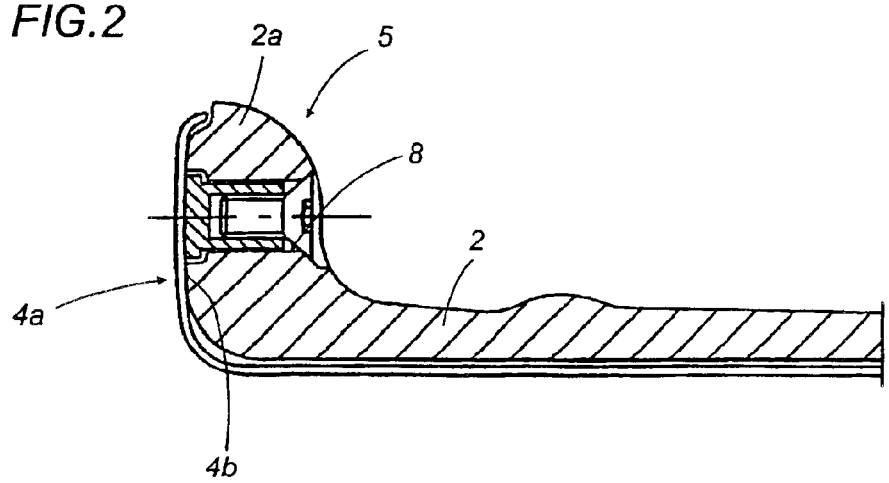
FIG. 2 is a cross section of a detail of the wheel of FIG. 1.

With reference to the accompanying drawings, the wheel according to the invention is labelled 1 in its entirety and comprises a rim 2, a disc 3, a protective ring 4 and means 5 for fixing the ring 4 to the rim 2.

Although FIG. 1 illustrates by way of example a two-piece wheel where the rim 2 is separate from the disc 3, the present invention is applicable to any type of wheel: monobloc wheels, that is to say, made in a single piece, two-piece wheels or three-piece wheels.

The protective ring 4 comprises an outer surface 4a and an inner surface 4b.

The outer surface 4a is suitably treated to provide a good ornamental effect. For example, the ring 4 may be made from metal sheet which allows a smoother and shinier surface finish directly from the production process without requiring further machining on machine tools. The ring 4 may be made of aluminium, stainless steel or even plastic.

In this case, too, a good ornamental effect can be conferred on the outer surface 4a directly in the production process, or the outer surface 4a can be subsequently painted, chromed or otherwise treated.

Whether the ring 4 is made of metal or plastic, the material should preferably be shockproof and scratchproof to resist shocks and scratching resulting from contact with curbs, walls, stones, etc.

FIGS. 1 to 4 illustrate a first embodiment of the means 5 for fixing the protective ring 4.

The fixing means 5 comprise at least one bush 6 attached to the ring 4 and a screw 7 that is inserted in the bush 6. For this purpose, the bush 6 is internally threaded to engage the screw 7. Other equivalent fixing systems such as, for example, a bayonet connection, may also be used.

The bush 6 is housed in a hole 8 made in the lip 2a of the rim 2 at a position such as to ensure a perfect fit even with tubeless tires. The screw 7 is housed in the lip 2a in such a way as not to interfere with the side of the tire.

The number of holes 8 may be greater than or equal to the number of bushes 6 in order to facilitate separation of the ring 4 from the rim 2, as described in more detail below.

Figure 5:
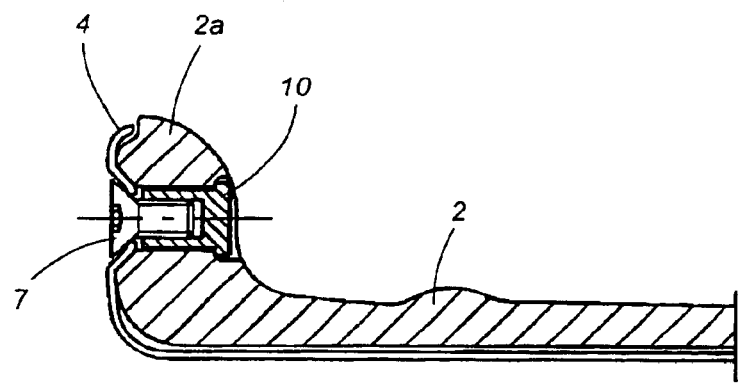
FIG. 5 is a partial cross section of another embodiment of the wheel according to present invention.
Figure 6:
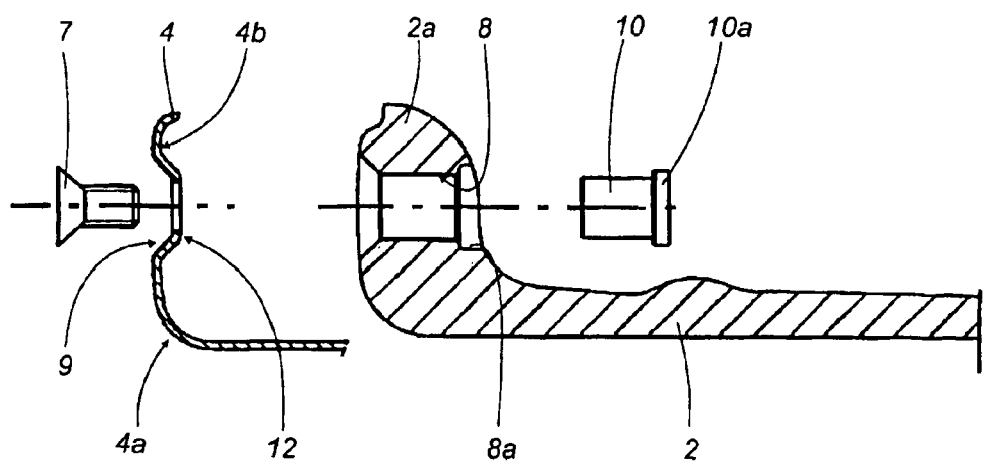
FIG. 6 is a partial cross section of parts of the wheel of FIG. 5.

FIGS. 5 and 6 illustrate another embodiment of the fixing means 5.

In this embodiment, the screw 7 is located on the outside of the lip 2a and the ring 4 has a recess 9 to accommodate the head of the screw 7 and prevent it from protruding. The fixing means 5 also comprise a mobile bush 10 located on the inside of the lip 2a and is housed within the lip 2a so as not to interfere with the side of the tire. To prevent undesired rotation of the mobile bush 10, the latter may have a prism shaped head 10a, for example hexagonal, that fits into a matching seat 8a of the hole 8. Thus, the mobile bush 10 is locked by the shape of the seat 8a and does not turn when the screw 7 is turned.

Alternatively, the mobile bush 10 might be fixed in the hole 8 with a permanent or separable adhesive. In this case, the adhesive must be strong enough to stop the mobile bush 10 from turning.

Other means of preventing the rotation of the mobile bush 10 include the use of couplings where the shape of the head 10a of the mobile bush matches the shape of the seat 8a, such as, for example: knurling, grooved profiles, polygonal profiles with rounded edges, keys, etc.

To remove the ring 4, it is necessary first of all to make the screws 7 accessible by removing the tire. The screws 7 can then be removed using ordinary tools. In the embodiment illustrated in FIGS. 5 and 6, the screws 7 can be accessed directly but the tire must be removed to take out the bushes 10.

Figure 3:
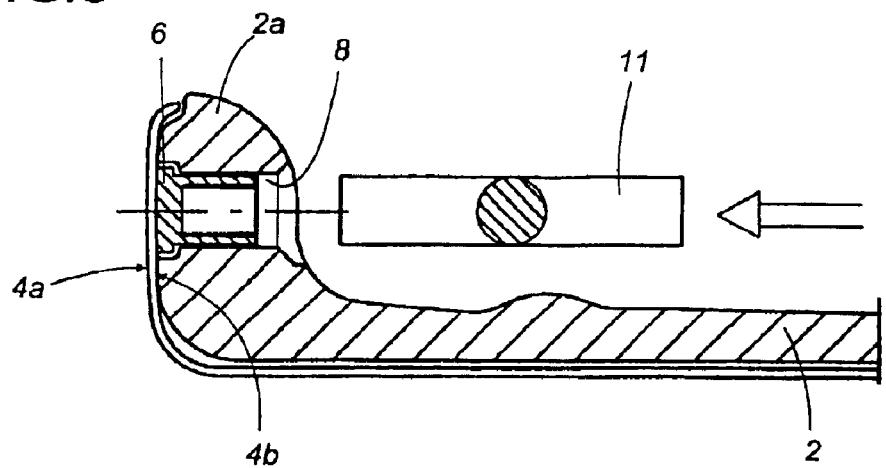
FIG. 3 is a cross section illustrating a step in the removal of a part of the wheel of FIG. 1.
Figure 4:
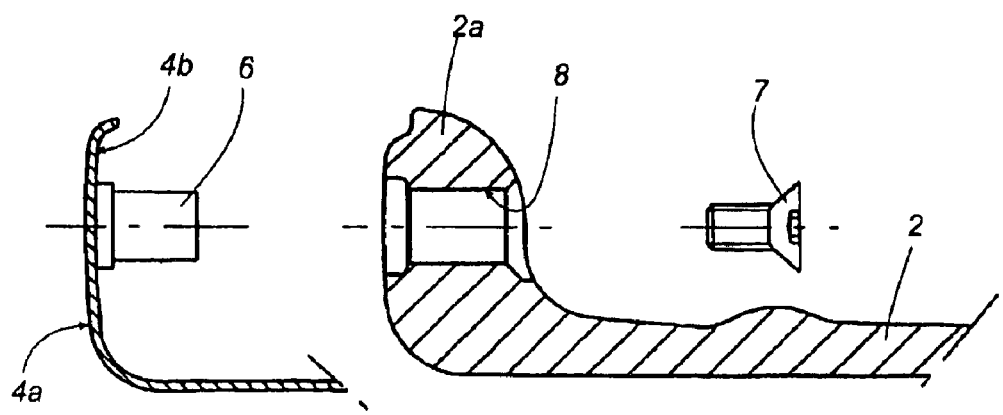
FIG. 4 is a partial cross section of parts of the wheel of FIG. 1.

The ring 4 can then be separated from the rim 2 using a disassembly tool 11 (illustrated in FIG. 3).

It should be noticed that the possibility of pressing on the inner surface 4b of the ring 4, by action of the tool 11 on bush 6 as shown in FIG. 3, enables the ring 4 to be separated from the rim 2 more easily than in conventional protective rings. Even when the ring 4 is snugly fitted or locked to the rim 2, the tool 11 can be used to exert strong pressure. For this purpose, and to better distribute the pressure, the holes B are made at equidistant intervals around the full circumference of the lip 2a and may be more numerous than the fixing means 5.

The disassembly tool 11 can be of the multiple head type so as to act on the inner surface 4b of the ring 4 at two or more points simultaneously. Even in the embodiment illustrated in FIGS. 5 and 6, the tool 11 can exert a high pressure because the ring 4 has an annular contact surface 12.

The invention achieves important advantages. The fact that the ring 4 is separate from the rim 2 means that no costly machining of the rim is required to obtain a good overall ornamental effect. Even in the event of denting or scratching caused by accidental contact with an obstacle, the attractive appearance of the wheel can easily be restored by simply changing the ring 4.

Easy access to the inner surface 4a of the protective ring 4 through the holes 8 in the lip 2a of the rim 2 facilitates separation of the ring 4 from the rim 2 even when the two parts are tightly engaged with or locked to each other. The high number of holes 8 and the possibility of using a tool 11 also facilitate disassembly of the ring 4.

It will be understood that the invention can be subject to modifications and variations without thereby departing from the scope of the inventive concept. Moreover, all the details of the invention may be substituted by technically equivalent elements.

KEY 1 wheel
2 rim
2a rim lip
3 disc
4 protective ring
4a outer surface of protective ring
4b inner surface of protective ring
5 means for fixing protective ring
6 fixed bush
7 screw
8 hole in lip 2a.
8a seating for bush head
9 recess in ring 4
10 mobile bush
10a head of bush 10
11 disassembly tool
12 annular contact surface of ring 4

What is claimed is:

1. A motor vehicle wheel, the wheel being selected from the group consisting of wheels made in a single piece, monobloc, in two pieces and three pieces, the wheel including a rim, a disc connected to the rim, a protective ring comprising a recessed hole and means for fixing the ring to the rim, wherein the rim comprises a lip for seating a tire, said lip including at least one hole housing the means for fixing, the means for fixing comprising at least one screw accommodated in the recessed hole of the ring and a mobile bush for engaging the screw.

2. The wheel according to claim 1, wherein the ring presents at least one annular contact surface surrounding the recessed hole.

3. The wheel according to claim 1, wherein the ring is made from sheet metal.

4. The wheel according to claim 1, wherein the ring is made from a plastic material.

5. A motor vehicle wheel, the wheel being selected from the group consisting of wheels made in a single piece, monobloc, in two pieces and three pieces, the wheel comprising a rim, a disc connected to the rim, a protective ring comprising an outer surface and an inner surface, and means for fixing the ring to the rim accessible from the inner surface of the ring, wherein the rim has a lip for seating a tire, said lip defined with at least one hole into which the fixing means are insertable, the means for fixing comprising at least one bush attached to the ring and a screw for engaging the bush.

6. The wheel (1) according to claim 5, wherein the number of holes is greater than or equal to the number of bushes.

7. The wheel according to claim 5, wherein the ring is made from sheet metal.

8. The wheel according to claim 5, wherein the ring is made from a plastic material.

9. The wheel according to claim 5, wherein the bush is attached to the inner surface of the ring.

* * * * *